United States Patent [19]

Marrocco, III et al.

[11] Patent Number: 5,668,245

[45] Date of Patent: Sep. 16, 1997

[54] POLYMERS WITH HETEROCYCLIC SIDE GROUPS

[75] Inventors: Matthew L. Marrocco, III, Santa Ana; Ying Wang, Diamond Bar; Virgil J. Lee, La Verne, all of Calif.

[73] Assignee: Maxdem Incorporated, San Dimas, Calif.

[21] Appl. No.: 552,128

[22] Filed: Nov. 2, 1995

[51] Int. Cl.$^6$ .................... C08G 69/00; C08G 73/00; C08L 79/04; C08L 79/08

[52] U.S. Cl. .................. 528/327; 528/176; 528/183; 528/191; 528/271; 528/337; 528/341; 528/348; 528/353; 528/357; 528/397; 528/422; 525/436; 525/534; 525/540

[58] Field of Search ............... 528/327, 176, 528/183, 191, 337, 341, 348, 353, 397, 422, 271; 525/540, 534, 436

[56] References Cited

U.S. PATENT DOCUMENTS

| | | | |
|---|---|---|---|
| 3,431,221 | 3/1969 | Hoess | 260/2 |
| 3,582,498 | 6/1971 | Bilow et al. | 260/2 |
| 3,595,811 | 7/1971 | Bilow | 260/2 |
| 3,756,982 | 9/1973 | Korshak | 260/41 |
| 3,826,783 | 7/1974 | Bloch | 260/47 |
| 3,998,864 | 12/1976 | Trevillyan | 260/439 |
| 4,108,835 | 8/1978 | Arnold et al. | 528/183 |
| 4,108,942 | 8/1978 | Chalk et al. | 260/875 |
| 4,207,407 | 6/1980 | Helminiak et al. | 525/425 |
| 4,263,466 | 4/1981 | Colon et al. | 585/421 |
| 4,284,834 | 8/1981 | Austin et al. | 585/25 |
| 4,326,989 | 4/1982 | Colon et al. | 252/429 |
| 4,377,546 | 3/1983 | Helminiak et al. | 264/232 |
| 4,384,107 | 5/1983 | Rogers et al. | 528/183 |
| 4,393,194 | 7/1983 | Guadiana et al. | 528/348 |
| 4,400,499 | 8/1983 | Colon | 528/284 |
| 4,433,132 | 2/1984 | Rogers et al. | 528/191 |
| 4,454,307 | 6/1984 | Cheshire | 525/379 |
| 4,461,886 | 7/1984 | Rogers et al. | 528/331 |
| 4,486,576 | 12/1984 | Colon et al. | 525/471 |
| 4,503,248 | 3/1985 | Guadiana et al. | 564/307 |
| 4,520,189 | 5/1985 | Rogers et al. | 528/331 |
| 4,525,413 | 6/1985 | Rogers et al. | 428/212 |
| 4,608,429 | 8/1986 | Rogers et al. | 528/194 |
| 4,628,125 | 12/1986 | Rogers et al. | 568/730 |
| 4,629,777 | 12/1986 | Pfeifer | 528/353 |
| 5,102,971 | 4/1992 | Himmler et al. | 528/167 |
| 5,169,929 | 12/1992 | Tour et al. | 528/397 |
| 5,227,457 | 7/1993 | Marrocco, III et al. | 528/183 |

FOREIGN PATENT DOCUMENTS

| | | |
|---|---|---|
| 1129418 | 10/1982 | Canada. |
| 130056 | 1/1985 | European Pat. Off.. |
| 0436111 | 11/1990 | European Pat. Off.. |
| 3821567 | 12/1989 | Germany. |
| 928576 | 12/1963 | United Kingdom. |
| 8907617 | 1/1989 | WIPO. |
| 9102764 | 8/1990 | WIPO. |

OTHER PUBLICATIONS

Rehahn et al., "Soluble Poly(para-phenylene)s. 1. Extension of the Yamamoto Synthesis to Dibromobenzenes Substituted with Flexible Side Chains," Polymer (Jun. 1989), pp. 1054–1059.

Rehahn et al, "Soluble poly(para-phenylene)s. 2. Improved synthesis of poly(para-2,5-di-n-hexylphenylene) via Pd-catalyzed coupling of 4-bromo-2,5-di-n-hexylbenzeneboronic acid," Polymer, 30, 1060–1062 (1989).

Rehahn et al., "Soluble Poly(para-phenylene)s, 3$^{a)}$ ", Makromol. Chem. 191, 1991–2003 (1990).

Reinhardt et al, "Pendant Oxy and Thioarylene Aromatic Heterocyclic Polymers," Polym. Prepr. (American Chemical Society, Division of Polymer Chemistry), 23 (2), 119 (1982).

Satoh et al, "Properties of Highly Conducting Poly(p-Phenylene) Film Prepared by an Electrochemical Method," Polymer Communications, 26, 396 (1985).

Schilling et al, "Diels–Alder Polymerizations. VI. Phenylated Polyphenylenes from Bis-2-pyrones and p-Diethynylbenzene," Macromolecules, vol. 2, No. 1, Jan.–Feb. 1969.

Stille et al, "Diels–Alder Polyers: Polyphenylenes Containing Alternating Phenylene and Triphenylphenylene Units," Journal of Polymer Science, Part B–7, 525 (1969).

Stille et al, "Poly(p-phenylene)," Macromolecules, 4, 515 (1971).

Trevillyan, Chem. Abs., 86:139404d, (1977).

Wallow et al, Aqueous Synthesis of Soluble Rigid-Chain Polymers. An Ionic Poly(p-phenylene) Analog. Polymer Preprints, vol. 32, No. 3, (1991).1.

Wallow et al. Chem. Abs., 115:280696z, (1991).

Wallow et al. Chem. Abs., 115:136902w, (1991).

Wellman et al, "Rodlike Polymer Reinforcement of an Amorphous Polymer Matrix, AB–PBI/PBT," CS Organic Cost. Plast. Chem., 93, 783 (1980).

Yamamoto et al, "A Novel Type of Polycondensation Utilizing Transition Metal–Catalyzed C–C Coupling. I. Preparation of Thermostable Polyphenylene Type Polymers," Bulletin of the Chemical Society, vol. 51, No. 7, Jul. 1978.

Zembayashi et al, "Nickel Phosphine Complex–Catalyzed Homo Coupling of Aryl Halides in the Presence of Zinc Powder," Tetrahedron Letters, 4089–4092 (1977).

(List continued on next page.)

Primary Examiner—Samuel A. Acquah
Assistant Examiner—P. Hampton-Hightower
Attorney, Agent, or Firm—Christie, Parker & Hale, LLP

[57] ABSTRACT

A new class of polymers include repeating units comprising one or more arylene units substituted with heterocyclic side groups. The heterocyclic substituted arylene repeat units have the general structural formula:

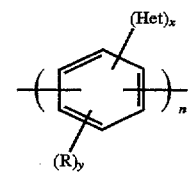

wherein Het is a heterocyclic group, R is an optional substituent, x is 1 or 2, and y is less than or equal to 4–x.

61 Claims, No Drawings

OTHER PUBLICATIONS

Advanced Organic Chemistry (Mar.), 2nd Edition, Published 1977, pp. 386–387.

Conference Report, "Specialty Polymers,"—3rd International Conference on New Polymeric Materials, Sep. 13–15, 1988.

Sales Brochure entitled "Polyphenylene Precursor PPP1," Imperial Chemical Industries PLC, Runcorn, Cheshire, England (4 pages).

LeBerre et al, "Electrochemical Polymerization of Para–dialkoxybenzenes. Part 1. Anodic Oxidation of Para–dimethoxybenzene in Dry Acetonitrile," J. Electroanal. Chem., 218, 173 (1987).

Liogon'kii et al, Chem. Abs, 96:7293p, 1982.

Maruyama et al, "Preparation and Properties of Poly(methylpyridine–2,5–diyl)s," Chemistry Letters, 643–646 (1992).

Marvel et al, "Preparation and Aromatization of Poly–1,3–cyclohexadine," JACS, 81, 448 (1959).

Matnishyan et al., "The Effect of Various Factors on the Synthesis of Polyarylenequinones," Vysokomol. soyed., A13: No. 5, 1009–1017, May 1971.

Mezhikovskii et al, Chem. Abs., 78:98152j, 1973.

English–language version of 78:98152j, Mezhikovskii et al, "Thermal and Thermo–Oxidative Degradation of Polysulphophenylenequinonones," Vysokomol. soyed., A14:.

Mukamal et al, "Diels–Alder Polymers. III. Polymers Containing Phenylated Phenylene Units," Journal of Polymer Science: Part A–1, vol. 5, 2721–2729 (1967).No. 11, 2397–2404, Nov. 1972.

Noll et al, "Poly(phenyl–1,4–phenylene), A Temperature–resistant, Soluble, and Melt–processable Derivative of Poly(p–phenylene)," Makromol. Chem., Rapid Commun. 11, 485–493 (1990).

Rehahn et al, "A High–Yield Route to 2,5–Di–n–alkyl–1,4–benzenedicarboxylic Acids," Synthesis, 386–388 (1988).

Braham et al, "Polyphenylenes vis Bis(2–pyrones) and Diethynylbenzenes. The Effect of m–and p–Phenylene Units in the Chain," Macromolecules, vol. 11, No. 2, 343, Mar.–Apr. 1978.

Chou et al, "Composites," Scientific American, Oct. 1986, pp. 193–202.

Colon et al, "Coupling of Aryl Chlorides by Nickel and Reducing Metals," J. Org. Chem., 51, 2627–2637 (1986).

Hwang et al, "Composites on a Molecular Level: Phase Relationships, Processing, and Properties," J. Macromolecules Sci.–Phys., B22(2), 231–257 (1983).

Hwang et al, "Molecular Composites of Rigid Rod Poly–P–Phenylenebenzobisthiazole (PPBT) in Thermoplastic Matrices," Organic Coatings and Applied Poly Science Proceedings, vol. 48, pp. 929–933 (1983).

Hwang et al, "Solution Processing and Properties of Molecular Composite Fibers and Films," Polymer Engineering and Science, Mid–Oct. 1983, vol. 23, No. 14, pp. 784–788.

Jones et al, "Polymerization of Aromatic Nuclei. XXVI. Poly(p–phenylene): Friedel–Crafts Alkylation, Molecular Weight, and Propagation Mechanism," J. Polym. Sci., Polym. Chem. Ed., 19 89 (1981).

Ballard et al, "Biotech Route to Polyphenylene," J. Chem. Soc., Chem. Commun., 954 (1983).

Ballauff, "Rigid Rod Polymers Having Flexible Side Chains. 1. Thermotropic Poly(1,4–phenylene 2, 5–dialkoxyterephthalate)s," Makromol. Chem., Rapid Commun., vol. 7, pp. 407–414 (1986).

POLYMERS WITH HETEROCYCLIC SIDE GROUPS

FIELD OF THE INVENTION

This invention relates to arylene polymers and particularly polyphenylene polymers having heterocyclic side groups, and co-polymers thereof. The polymers can be used for dielectric insulators in electrical applications, as high temperature plastics, and where a major fraction of the polymer backbone is paraphenylene as structural plastics. This invention also relates to ionic compositions comprising acids and polyphenylene polymers having heterocyclic side groups. The ionic compositions can be used for polymeric electrolytes.

BACKGROUND OF THE INVENTION

High performance composites have achieved a prominent role in the design and construction of many products, including military and commercial aircraft, sports and industrial equipment, automotive components and the like. Composites fill the need for stiffness, strength and low weight that cannot be met by other materials.

The most widely used high performance composites are fiber-polymer composites in which fibers such as oriented carbon (graphite) fibers are embedded in a suitable polymer matrix. Potential alternatives to fiber-polymer composites are molecular composites. These are materials composed of rigid-rod polymers embedded in a flexible polymer matrix. Molecular composites offer the prospect of being more economical and easier to process than conventional fiber-polymer composites.

One rigid-rod polymer produced in the past is polyphenylene. Polyphenylene is of particular interest because the basic phenylene unit has excellent thermal and chemical stability.

One method for the preparation of polyphenylenes is the oxidative coupling of aromatic compounds, such as benzene, as disclosed in P. Kovacic, et al., *Chem. Rev.*, 1987, 87, 357–379. This method involves a chemical oxidant such as cupric chloride and a Lewis acid catalyst, and in general results in insoluble polyphenylenes of uncertain structure. It is thought that polyphenylenes prepared by oxidation of benzene are branched and low in molecular weight. Polyphenylenes of better defined composition have been reported by J. K. Stille, *Die Makromolekulare Chemie*, 1972, 154, 49–61.

In the past, two technical difficulties limited the use of molecular composites. First, the composites were typically a blend of the rigid rod polymers and flexible polymer. Homogeneous blends, particularly with anything but a small weight fraction of the rigid rod polymer were very difficult to obtain. Second, rigid rod polymers of significant molecular weight were difficult to prepare. For example, in the preparation of polyparaphenylene, the growing phenylene chain becomes decreasingly soluble and precipitates from solution, terminating the polymerization reaction.

M. L. Marrocco, et al., in U.S. Pat. No. 5,227,457 ("Marrocco, et al."), which is incorporated herein by reference, discloses substituted rigid-rod (i.e. predominately 1,4 or para linked) polyphenylenes made soluble by the attachment of flexible organic side groups. The side groups are chosen for a positive interaction with solvent, but are electrically neutral (uncharged) groups. The chemical and physical properties, including thermal stability, glass transition temperature ($T_g$), and dielectric constant (K), of substituted polyphenylenes depends on the side groups attached to the polyphenylene backbone. In the substituted polyphenylenes disclosed by Marrocco, et al., inclusion of the flexible side groups resulted in a decrease in the $T_g$ of the polymer.

For many applications, particularly in the electronics industry, it would be desirable to develop polyphenylenes having higher thermal stability and higher $T_g$, while maintaining good solubility and processability and without increasing K. It would therefore be desirable to find side groups that can be appended to polyphenylenes which have high thermal stability, but which do not lower the $T_g$ as much as previously disclosed side groups. It would also be desirable to find side groups which contribute to the solubility of the polymer but do not increase K. In addition, it would be desirable to find side groups which are basic and therefore protonatable and also thermally stable. This latter feature would allow the polymers to be used in ion exchange applications.

SUMMARY OF THE INVENTION

Polymers are provided in accordance with practice of the present invention which include repeat units comprising an aromatic nucleus substituted with one or more heterocyclic groups. The aromatic nucleus may be a phenylene nucleus, linked into the polymer backbone through the ortho (1,2), meta (1,3) or para (1,4) positions. The aromatic nucleus may itself be a heteroaromatic nucleus having one, two, or three of the CH groups of the ring replaced with N. With one CH group substituted with N the aromatic nucleus is a pyridine nucleus, with two N the aromatic nucleus is a pyrazine, pyrimidine, or pyridazine nucleus, with three N the aromatic nucleus is a triazine nucleus.

The heterocyclic side groups impart a number of useful properties to the polymers of the present invention. Heterocyclic groups, especially heteroaromatic groups, are extremely thermally and chemically stable. Heterocyclic groups are generally basic and will react with acids to form ionic species. Heterocyclic groups are slightly polar, allowing good interaction with solvent to help solubility, while not being so polar as to impart a high dielectric constant. Heterocyclic groups can participate in hydrogen bonding. Heterocyclic groups, especially heteroaromatic groups, can be relatively rigid resulting in a polymer having a high $T_g$.

DETAILED DESCRIPTION OF THE INVENTION

In one embodiment, the polymer of the present invention incorporates repeating units which have the general structure:

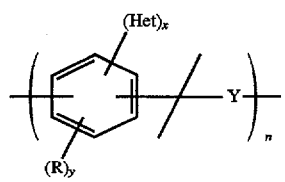

wherein one to three CH units in the aromatic rings being optionally replaced by nitrogen (N) atoms; Het is a heterocyclic group; x is 1 or 2, y is less than or equal to 4−x (if x=1 then y=0 to 3, and if x=2 then y=0 to 2); the R groups are independently alkyl, aryl, alkoxy, aryloxy, ketone (including alkyl ketone and aryl ketone), aldehyde, amide (including alkyl amide and aryl amide), amine ester (including alkyl ester and aryl ester), sulfone (including alkyl sulfone and aryl sulfone), cyano, fluoro, and oligomeric or polymeric groups including polyalkeneoxy, polyaryleneoxy, polyarylenesulfide, polyarylenesulfone, polyphenoxyphenylketone, polystyrene, polyphenylene, polyamide, and polyimide; Y is a difunctional group chosen from nil, —Ar—, —Z—, —Z—Ar—, and —Ar—Z—Ar—, where Z is a divalent group chosen from the group consisting of —O—, —S—, —NR'—, —O(CO)—, —(CO)N (CO)—, —NR'(CO)—, phthalimide, pyromellitimide, —CO—, —CH$_2$—, —CF$_2$—, and —CR'R"—; R' and R" are alkyl or aryl, and taken together may be bridging; Ar is arylene or heteroarylene or arylene or heteroarylene substituted with one or more R groups; and n is greater than about 4, preferably about 10 to 100,000, more preferably about 20 to 10,000, and most preferably about 50 to 1,000, and represents the number average degree of polymerization. If Y is nil, n typically will not exceed about 500.

In the formula above, the slash (/) indicates a generic co-polymer which may be a block co-polymer or a random co-polymer.

Heterocyclic groups may be single ring, fused ring, or multiple ring groups, preferably comprising at least one hetero atom selected from boron, nitrogen, oxygen, sulfur, and phosphorous, and containing only H, B, C, N, O, P and S.

Heterocyclic groups which can be used in the practice of this invention include, but are not limited to benzimidazolyl, benzofuranyl, benzoxazolyl, benzthiazolyl, dioxolanyl, dithianyl, furanyl, imidazolyl, indolyl, isoquinolinyl, maleimidyl, morpholinyl, oxadiazolyl, oxazolyl, phthalimidyl, piperidinyl, purinyl, pyranyl, pyrazinyl, pyridazinyl, pyridyl, pyrimidinyl, quinazolinyl, quinazolonyl, quinolinyl, quinolonyl, quinoxalinyl, succinimidyl, tetrahydrofuryl, thiophenyl, triazinyl, and the like.

Preferred heterocyclic groups are 2-pyridyl, 3-pyridyl, 4-pyridyl, 2-pyrimidinyl, 4-pyrimidinyl, 2-pyrazinyl, 1,3,5-triazin-2-yl, 2,4-di-phenyl-1,3,5-triazin-2-yl, 2-quinolyl, 4-quinolyl, 2-quinoxalyl, 2-quinazolyl, 1-isoquinolyl, 4-isoquinolyl, 2-[(1H)4-quinazolonyl], 4-[1H]2-quinazolonyl, 2-indolyl, benzo[b]thiophen-2-yl, benzo[b]furan-2-yl, 2-benzoxazolyl, 4-benzoxazolyl, 5-benzoxazolyl, 5-phenyl-2-oxazolyl, 4,5-dimethyl-2-oxazolyl, 2-benzthiazolyl, 4-benzthiazolyl, 5-benzthiazolyl, 2-benzimidazolyl, 2-thiophenyl, 3-thiophenyl, 2-imidazolyl, 2-quinolone-4-yl, 4-quinolone-2-yl, 3-methylpyridin-2-yl, and 4-phenylquinolin-2-yl, 1-succinimidyl, 3-succinimidyl, 1-phthalimidyl, 1-phenyl-3-phthlimidyl, 1-maleimidyl, 1-nadimidyl, 2-dioxolanyl, and 2-dithianyl.

The above examples are meant to be exemplary of the many possible heterocyclic side groups useful in the practice of the present invention. As will be apparent to those of ordinary skill in the art, the above mentioned heterocyclic groups may be attached to the polymer main chain at any position on the ring. For example, while 2-quinolyl and 4-quinolyl are mentioned in the above list 3-quinolyl, 5-quinolyl, 6-quinolyl, 7-quinolyl, and 8-quinolyl are also contemplated for use in the present invention. The heterocyclic groups may also be further substituted with R at any available position. Although particular heterocyclic ring systems are listed above, this does not limit in any way the various heterocyclic ring systems useful in practice of the present invention.

Examples of alkyl groups which can be used in the practice of this invention include, but are not limited to, methyl, ethyl, propyl, n-butyl, t-butyl, dodecanyl, trifluoromethyl, perfluoro-n-butyl, 2,2,2-benzyl, 2-phenosxyethyl land the like.

Examples of aryl groups which can be used in the practice of this invention include, but are not limited to, phenyl, 2-tolyl, 3-tolyl, 4-tolyl, naphthyl, biphenyl, 4-phenoxyphenyl, 4-fluorophenyl, 3-carbomethoxyphenyl, 4-carbomethoxyphenyl and the like.

Examples of alkoxy groups which can be used in the practice of this invention include, but are not limited to, methoxy, ethoxy, 2-methoxyethoxy, t-butoxy and the like.

Examples of aryloxy groups which can be used in the practice of this invention include, but are not limited to, phenoxy, naphthoxy, phenylphenoxy, 4-methylphenoxy and the like.

Examples of alkyl ketone groups which can be used in the practice of this invention include, but are not limited to, acetyl, propionyl, t-butylcarbonyl, 2-ethylhexylcarbonyl and the like.

Examples of aryl ketone groups which can be used in the practice of this invention include, but are not limited to, phenylcarbonyl (benzoyl), phenoxyphenylcarbonyl, 1-naphthylcarbonyl, 2-naphthylcarbonyl, nicotinoyl, isonicotinoyl, 4-methylphenylcarbonyl, 2-fluorophenylcarbonyl, 3-fluorophenylcarbonyl, 4-fluorophenylcarbonyl, and the like.

Examples of amide groups which can be used in the practice of this invention include, but are not limited to, N,N-dimethylaminocarbonyl, N-butylaminocarbonyl, N-acetylamino, N-acetylmethylamino, N-phenyl-aminocarbonyl, N,N-diphenylaminocarbonyl, N-phenyl-N-methyl-aminocarbonyl, N-benzoylamino, N-benzoylmethylamino, and the like.

Examples of ester groups which can be used in the practice of this invention include, but are not limited to, methoxycarbonyl, benzoyloxycarbonyl, phenoxycarbonyl, naphthyloxycarbonyl, ethylcarboxy, phenylcarboxy, 4-fluorophenylcarboxy, 2-ethylphenylcarboxy, and the like.

Examples of alky sulfone groups which can be used in the practice of this invention include, but are not limited to, methylsulfonyl, ethylsulfonyl and the like.

Examples of aryl sulfone groups which can be used in the practice of this invention include, but are not limited to, phenylsulfonyl, tolylsulfonyl and the like.

The above examples are meant to be exemplary of the many possible R groups useful in the practice of the present invention. As will be apparent to those of ordinary skill in the art, the above mentioned R groups may be attached to the polymer chain at any position on the ring.

Examples of Ar which can be used in the practice of this invention include, but are not limited to, phenylene (1,2-, 1,3-, and 1,4-), 4-benzoyl-1,3-phenylene, 5-benzoyl-1,3-phenylene, 2-benzoyl-1,4-phenylene, 2-phenyl-1,4-phenylene, 1,4-naphthalenediyl, 2,4-toluenediyl, 2,5-xylenediyl, 4-carboxymethyl-1,3-phenylene, 2-carboxymethyl-1,4-phenylene, 5-carboxymethyl-1,3-phenylene, 4,4'-biphenyldiyl, 3,5-pyridinediyl, 2,6-pyridinediyl, 2,4-pyridin-ediyl, 5-amino-1,3-phenylene, 4,7-quinolinediyl, 2,6-purine, 3,6-pyridazine, 2,5-thiophenediyl, and the like. Any other positional isomers of the above arylene groups not specifically listed above may be Ar, e.g. 2,4-quinolinediyl, 2,5-quinolinediyl, 2,6-quinolinediyl, and the like. One skilled in the art will be able to recognize other Ar nuclei suitable for use in the present invention.

Where Y is Ar, the Ar repeat unit may be derived from the corresponding dihalo, disulfonato, or halosulfonato monomer. For example, 1,3-phenylene from 1,3-dichlorobenzene, 2-benzoyl-1,4-phenylene from 2,5-dichlorobenzophenone or 5-chloro-2-sulfonoxy-methyl-benzophenone, and 4,7-quinolinediyl from 4,7-dichloroquinoline.

Where Y is amide, ester, imide and the like, the repeat unit may be derived from a diacid, or a dianhydride, which condenses with a diamine, or diol.

Preferred examples of ester and amide type Y are: -(phenylene-CONH-phenylene-NHCO)-phenylene, -(phenylene-CONH-phenylene)-, -(phenylene-COO-phenylene-OCO)-phenylene-, -(phenylene-carbonyl)-phenylene-, -(phenylene-carbonyl-phenylene-oxo-phenylene-carbonyl-phenylene)- and the like.

Where the polymer of the present invention is a block co-polymer the repeat units Y form oligomeric or polymeric segments non-limiting examples of which are polyamide, polyarylate, polyaryleneoxide, polycarbonate, polydimethyl-siloxane, polyester, polyetherketone, polyphenylene, substituted polyphenylene, polyphenylenesulfide, polystyrene, and the like.

Polyaryleneoxide is meant here to be a generic name for polymers of the type (—Ar—O—)$_n$. Polyaryleneoxides include, but are not limited to, poly(2,6-di-methyl-1,4-phenyleneoxide), poly(2,6-diphenyl-1,4-phenyleneoxide), poly(oxy-2,3,5,6-tetra-fluorophenylene), and poly(oxy-2,6-pyridinediyl). Polyetherketone is meant here to be generic for the various polymers comprised of phenylene, oxo, and carbonyl repeat units, including but not limited to poly(oxy-1,4-phenylene-oxy-1,4-phenylene-carbonyl-1,4-phenylene), also known as PEEK for polyether ether ketone, and the related polymers PEK, PEKK, and the like. Polyarylate is meant here to be a generic name for the various polymers formed from terephthalic acid or isophthalic acid and diols such as bis-phenol A (2,2'-isopropylidenediphenol), resorcinol, hydroquinone, 4,4'-dihyroxybipyhenyl and the like. The above generic names will be known to those skilled in the art.

Polyamide includes but is not limited to polymers formed from the formal condensation of diamines such as 1,4-butane diamine, 1,6-hexane diamine, 4,4,'-methylenedianiline, 1,3-phenylenediamine, 1,4-phenylenediamine, and the like, with diacids such as adipic acid, isophthalic acid, terephthalic acid, succinic acid, and the like.

Polyester includes, but is not limited to, polymer formed by the formal condensation of diols such as ethylene glycol, 1,6-hexane glycol, hydroquinone, propylene glycol, resorcinol, and the like, with diacids such as adipic acid, isophthalic acid, terephthalic acid, succinic acid, and the like.

Where Y is nil, the polymers of the present invention have the general structure 2.

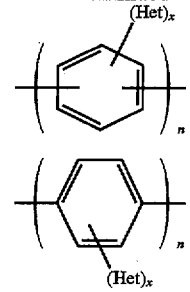

2

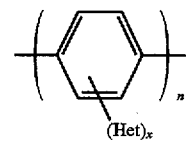

3

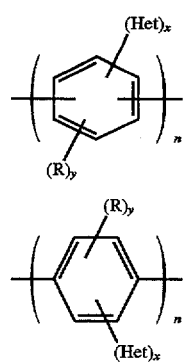

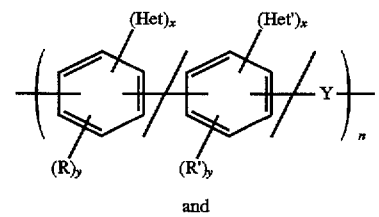

4

5

Where Y is nil and substantially all of the monomer units are para or 1,4, the polymers have general structure 3. General structures 4 and 5 show the case wherein Y is nil and there are no side groups except the heterocyclic groups, and in 5 where substantially all of the repeat units are 1,4 catenated. For structures 2–5 Het, R, n, x, and y are as defined above.

The polymers of the present invention as shown in structure 1 may be random, alternating, block, or of other repeat sequence. The (Het)$_x$ and (R)$_y$ groups of repeat units may be chosen independently leading to co-polymers of the type:

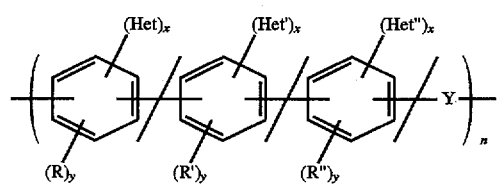

and and so forth. More than one Y may also be present to give co-polymers.

Denoting the general heterocyclic substituted arylene unit of structure 2 by H, general structure 1 may be represented by —(H—/—Y—)—. Non-limiting examples of co-polymers are then —(H—/—H'—/—Y)—, —(H—/—H'—/—H"—/Y)—, —(H—/—Y—/—Y')—, and the like.

Where specific monomer ratios of phenylene and Y are provided they are indicated in the structural drawing as mol percents above and below the slash separating the monomer units.

The general structure below indicates a molar ratio of phenylene to Y of 80 to 20, and as above the sequence (random, block, etc.) is not implied.

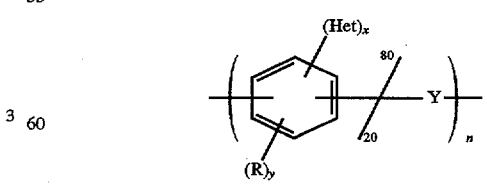

The specific structure below shows a random co-polymer of benzoxazole appended 1,4-phenylene (85 mol % of the repeat units) and 1,3-phenylene (15 mol % of the repeat units).

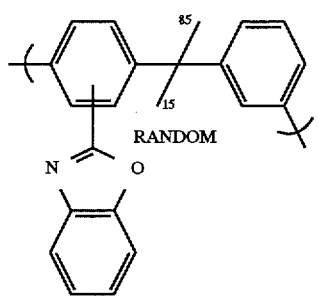
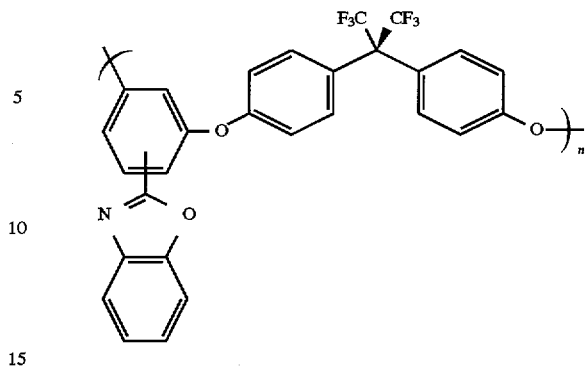
Additional specific structures below are non-limiting examples of polymers of the present invention.
A specific structure illustrating a block co-polymer of the present invention is:
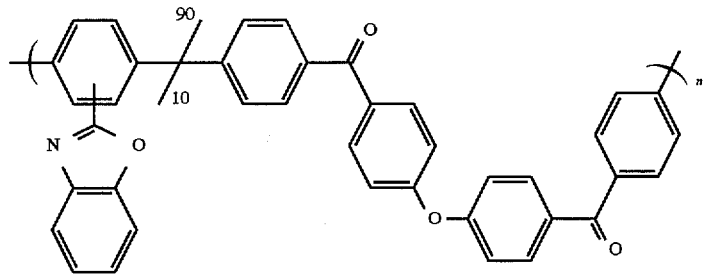
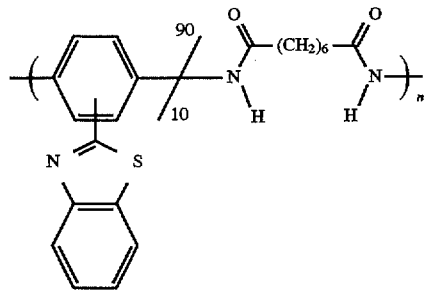
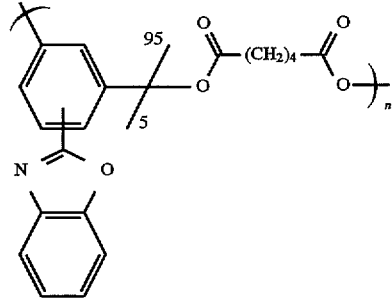
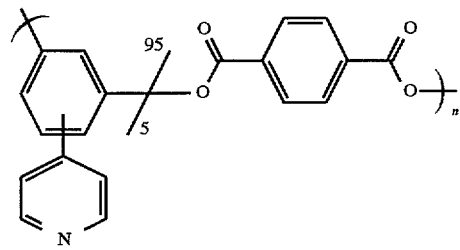
A specific structure illustrating an alternating polymer of the present invention is:

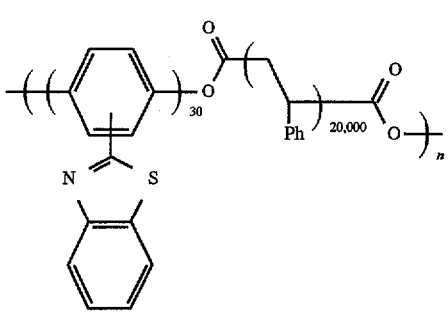

The general structural formula of a block co-polymer of the present invention is —((H)$_l$(Y)$_m$)$_n$—, where l and m are 1 or greater and represent the number average degree of polymerization of the block or segment. The general structural formula of an alternating polymer of the present invention is —(H—Y)$_n$—. These structural types are illustrative and not meant to be limiting in any way.

The polymers of the present invention may have end groups derived from the monomers, or from specific end cappers added during the polymerization reaction. The end groups may also be further modified by chemical transformation, such as removal of a protecting group, or reaction in a post-polymerization step. The end groups may be used to form block co-polymers with other monomers or polymers, or as crosslinking groups in a curing process.

The polymers of the present invention may be prepared from monomers selected from the following group:

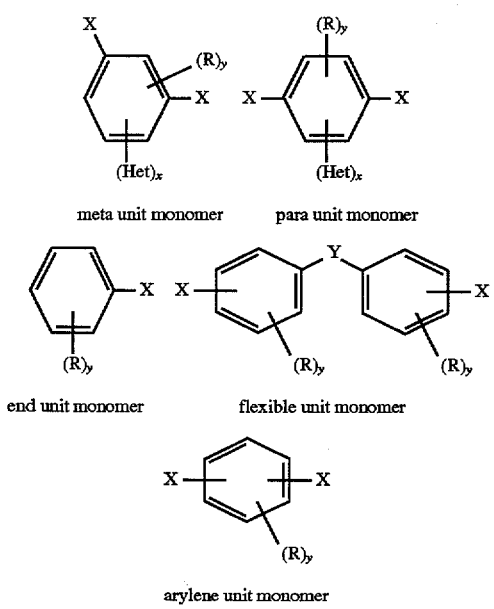

where X is chloro, bromo, iodo, or a sulfonate, preferably chloro.

Non-limiting examples of sulonates are methane sulfonate, phenyl sulfonate, toluene sulfonate, trifluoromethane sulfonate, and fluorosulfonate.

Many heterocycle substituted dihalophenylenes that are useful as monomers in practice of the present invention are known compounds. 2-(2,4-dichlorophenyl)-3,5-dimethylpyridine [71523-00-7], 2-(3,5-dichlorophenyl)-3,5-dimethylpyridine [71523-01-8], 4-(2,4-dichlorophenyl)-3,5-dimethylpyridine [71523-07-4], 6-(3,5-dichloro-phenyl)-3 (2H)-pyridazinone [66710-61-0], 5-(2,4-dichlorophenyl)-2, 4-dihydro-(3H)-pyrazol-3-one [63554-73-4], 1-(2,5-dichlorophenyl),1,2-dihydro-5-methyl-(3H)-pyrazolone [14575-32-7], 3-[69277-30-1], and (2,4-dichlorophenyl) furan. Heterocycle substituted dihalobenzenes may be commercially available, such as 1-(3,5-dichloro)-2,5-dimethylpyrrole.

Heterocycle substituted dihalophenylene monomers may be prepared, for example, from commercially available 2,4-dichlorophenylacetic acid, or 2,4-dichlorophenyl acetonitrile, by reaction under Vilsmeier-Haack conditions (for example following Z. Arnold, Coll. Czech. Chem. Comm., 1961, 26, 3051–3057) to form the 2-(2,4-dichlorophenyl)-malondialdehyde equivalent. The malondialdehyde group (or its chemical equivalent) may then be transformed into various heterocycles including but not limited to pyranones, isoxazoles, pyrazoles, pyrimidines, pyrimidones, and pyridones, using methods well known in the art.

Heterocyclic substituted dihalophenylene monomers may also be prepared by Gomberg-Bachman coupling of arenediazonium salts and a heterocycle (see J. B. Beadle, S. H. Korzeniowski, D. E. Rosenberg, B. J. Garcia-Slanga, and G. W. Gokel, J. Org. Chem., 1984, 49, 1594–1603). Non-limiting examples of arenediazonim salts are 2,4-dichlorobenzenediazonium tetrafluoroborate, 2,5-dichlorobenzenediazonium hexafluorophosphate, and the like. Non-limiting examples of heterocycles are pyridine, quinoline, thiophene, and the like.

Other methods of producing heterocycle substituted monomers useful in the practice of the present invention are given in the Examples below.

The above monomers may be polymerized to form the polymers of the present invention by reductive coupling using nickel (0) compounds as described by T. Kanbara, T. Kushida, N, Saito, I. Kuwajima, K. Kubota, and T. Yamamoto, Chemistry Letters, 1992, 583–586, or nickel catalyzed reductive coupling as described in '457 or U.S. Pat. No. 5,241,044.

The heterocyclic groups of the polymers of the present invention may be present in the monomers used to prepare the polymers as in the heterocyclic substituted dihalophenylene monomers mentioned above, or the heterocyclic groups may be formed after polymerization by chemical transformation of a suitable precursor group. For example, an aldehyde or ketone side group may be transformed into a cyclic acetal or cyclic ketal respectively. Carboxylic acid or ester side groups may be transformed into oxazole, pyrimidine, thiazole, and other 1,3 heteroatom groups. Ketomethylene groups may be condensed with aromatic o-aminoketones to form quinoline groups. Other transformations will be apparent to those skilled in the art.

The polymers of the present invention may also be prepared by the reaction of dimeric, oligomeric, or polymeric compounds having the formula:

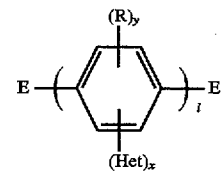

with a complementary difunctional monomer, oligomer, or polymer having the formula:

$$E'\!-\!\!\left(\!-Y\!-\!\right)_{\!m}\!\!-\!E'$$

where E and E' are complementary reactive groups. For example, E and E' may be chosen from the same row in Table 1.

TABLE 1

| E | E' |
|---|---|
| —ArCO₂H, —CO₂H, —ArCOCl, —COCl | —OH, —NH₂ |
| —ArOH, —OH | —CO₂H, —COCl, —CNO |
| —ArNH₂, —NH₂ | |
| | —CHCH₂O⎤, SiRR'Cl |
| —ArF, F | —OH |

Thus, if E is —ArCO₂H and E' is —OH the polymer will be a polyester.

The following reactions illustrate three particular polymers of the present invention and their method of preparation. The first where the heterocycle substituted dimer monomer is derived from the acid catalyzed condensation of 2-chloro-4-fluorobenzoic acid and 2-aminophenol to give 2-(2-chloro-4-fluorophenyl)-benzoxazole which is then reductively coupled with Zn using $NiCl_2(PPh_3)_2$ as catalyst.

The second example illustrates the case wherein the oligomeric monomer is derived from the nickel catalyzed reductive coupling of 2,5-dichlorobenzaldehyde ethyleneglycol acetal and 3-chloroaniline as endcapper; and the polymer is formed by condensation of the oligomeric diamine with isophthaloyl chloride to give a segmented polymer bearing heterocyclic side groups.

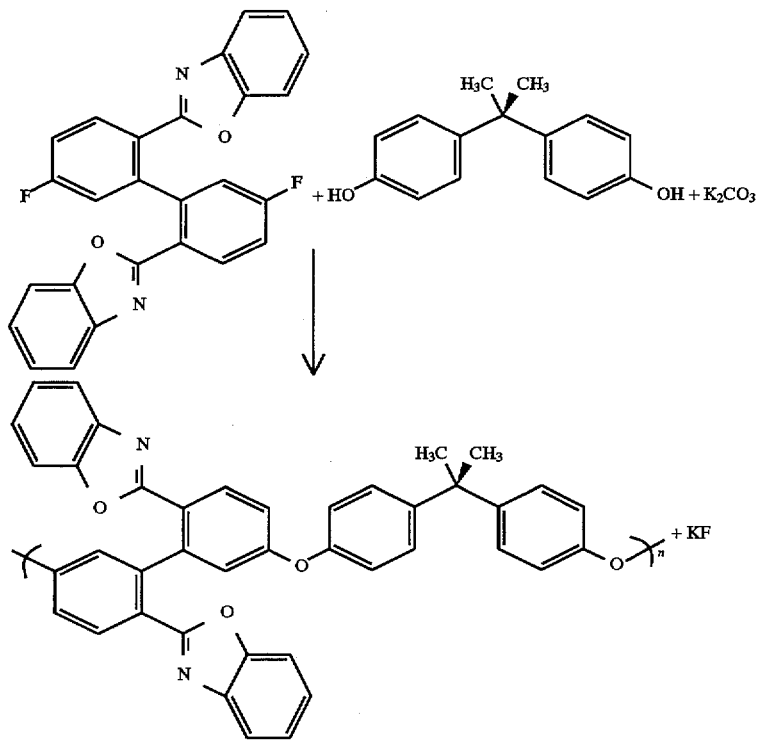

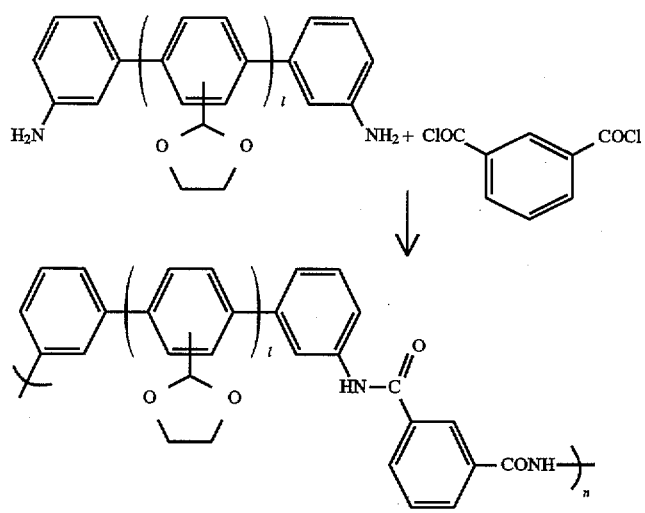

A third example illustrates the case wherein a oligomeric or polymeric segment bearing pendent heterocyclic groups is allowed to react with isophthaloyl chloride and meta-phenylene diamine to form a block co-polymer.

poly(isophthalamido-1,3-phenylene). Other E and E' will be apparent to those skilled in the art. The general requirements are that E not interfere with the formation of the reactive oligomer E—(H)—E, and that E and E' are suitably reactive.

Scheme 1

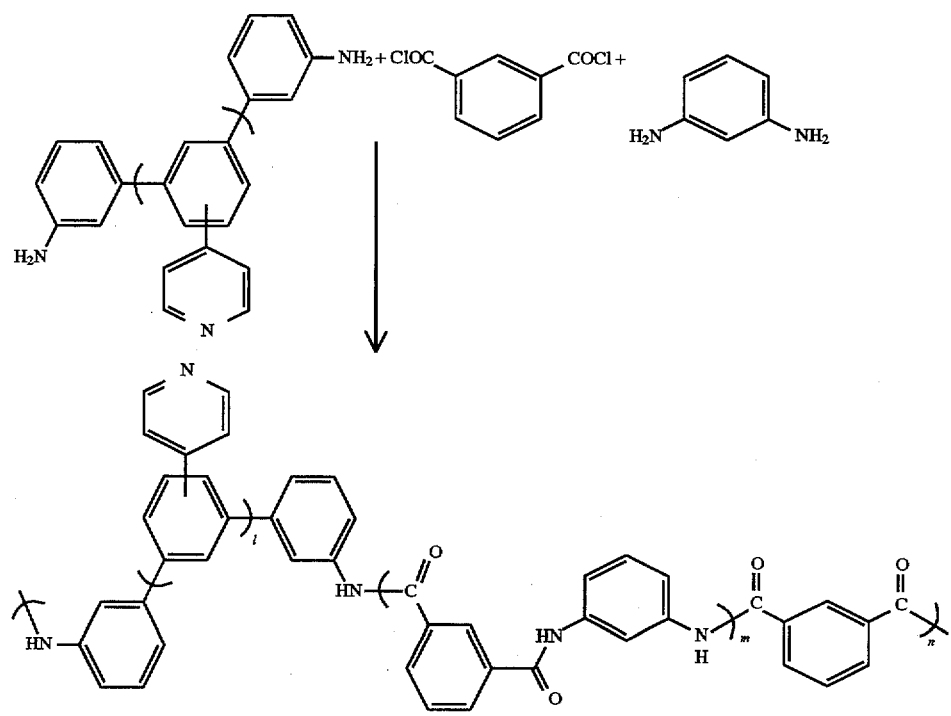

Where —((H)$_l$(Y)$_m$)$_n$— is prepared from E—(H)$_l$—E and E'—Y—E' there may be additional linking groups derived from E and E' or there may be an additional fractional part of the repeat unit Y. These are considered to be part of the (Y)$_m$ block in the formula —((H)$_l$(Y)$_m$)$_n$—. For example, in Scheme 1 above there is an additional isophthaloyl unit (a part of the Y repeat unit) and two additional amino-1,3-phenylene units (derived from the E groups). The product polymer of Scheme 1 is considered to have Y equal to The usual protective groups may be used in the preparation of E—(H)—E.

Where E is F, the heterocyclic side group must be electron withdrawing enough to activate F toward nucleophilic displacement, and the heterocyclic side group must be ortho or para to F. Where E is —Ar'F, Ar' is an arylene group that has an electron withdrawing group ortho or para to F. Non-limiting examples of —Ar'F are 4-(4'-fluorobenzophenone) and 5-(2-fluorobenzophenone).

Even using nominally pure monomer one may expect a small fraction of the repeat units to differ from the norm. For example, a polymer wherein a small fraction of the heterocyclic side groups are missing may be formed. A repeat unit without a Het side group is a Y repeat unit. Thus where Y is intended to be nil there may still be a small fraction of adventitious Y repeat units.

If the ratio of repeat units is not given explicitly, a range of 99.9/0.1 to 1/99 is assumed. About 0.1 mol percent Y can have an observable effect on polymer properties, for example, altering melt flow or $T_g$, both of which are of practical importance. As little as 0.1 mol percent heterocyclic arylene repeat unit will significantly affect the overall polymer properties. However, for many practical applications it will be desirable to have more than 0.1%, and preferably about 1% or more heterocyclic arylene repeat unit. For example, a polymer with 1% of the repeat units appended with heterocyclic groups will behave very differently towards acid than a polymer with no heterocyclic groups, and will have a very different ionic conductivity. Although polymer properties are more closely related to weight percent Y than mol percent Y, the limits of about 0.1 mol percent and 99 mol percent are convenient and sufficient for the purposes of the present invention.

The heterocyclic side groups of the polymers of the present invention serve to increase the solubility of the polyarylene backbone. Unsubstituted polyarylenes, including poly(1,4-phenylene), poly(1,3-phenylene), and poly(1,4-phenylene-co-1,3-phenylene) are all highly insoluble in common organic solvents, with solubility dropping rapidly with increasing MW. Only very low MW unsubstituted polyarylenes can be prepared, because the growing polymers precipitate out of solution, and once precipitated can no longer grow.

Side groups increase solubility by increasing the entropy of the polymer chain, that is by allowing additional possible conformations in solution. The more flexible the side group the more it will contribute to the polymer solubility. Flexible side groups, however, also lower the $T_g$, lower the modulus, and increase the coefficient of thermal expansion (CTE) of the polymer, and therefore are undesirable in many applications such as printed wiring boards and composite aircraft wing structures where high $T_g$, high modulus, and low CTE are required. Heterocyclic side groups will vary in flexibility, and the least flexible heterocyclic side is preferred. In general, heteroaromatic groups are the least flexible heterocyclic groups.

Polymers having side groups which are placed randomly along the polymer chain will have higher solubility than polymers with side groups regularly placed along the chain. Therefore random co-polymers with different side groups and homopolymers with random regiochemistry (i.e. not all head-to-head or head-to-tail) will be more soluble than for example head-to-head homopolymers. The heterocyclic side groups of the present invention are preferably randomly or partly randomly distributed among the possible positions on the polymer backbone.

Polyarylenes are insoluble partly because they pack very well in the solid state. Heterocyclic side groups that disrupt packing of the polymer will increase solubility. Heterocyclic side groups are preferably placed ortho to the site of catenation. Groups ortho to the site of catenation have a large steric repulsion for the adjacent monomer unit. This steric repulsion causes a twisting of the adjacent repeat units out of a common plane, thereby reducing the efficiency of packing in the solid state and increasing solubility. If adjacent repeat units both have heterocyclic side groups in the ortho positions (e.g. heterocyclic groups in the 2 and 2' positions relative to the bond joining the repeat units) the steric repulsion and the twist angle will be very large, and solubility will be increased correspondingly. It is desirable that the polymers of the present invention have heterocyclic groups ortho to the site of catenation. Although the polymers of the present invention need not have any ortho heterocyclic side groups, solubility will be improved if 5% or more of the repeat units will have ortho heterocyclic groups, more preferably at least 10% of the repeat units will have ortho heterocyclic groups, even more preferably at least 25% of the repeat units will have ortho heterocyclic groups, and most preferably at least 50% of the repeat units will have ortho heterocyclic groups.

Side groups that have polarity similar to the solvent polarity typically increase the polymer solubility. Side groups that have very different polarity than the solvent may actually decrease solubility. Heterocycles are typically of moderate to high polarity and therefore the polymers of the present invention are most soluble in moderate to highly polar solvents. Solvents useful for dissolving polyarylenes with heterocyclic side groups include but are not limited to anisole, cresol, N-cyclohexylpyrrolidone, dichlorobenzene, dimethylsulfoxide, N,N-dimethylacetamide, N,N-dimethylformamide, formamide, N-methylacetamide, methylbenzoate, N-methylpyrrolidone, phenol, tetramethylurea, and the like.

Heterocyclic groups are basic and may be protonated by Bronsted acids and may form complexes with Lewis acids. The relative $pK_a$s of the acid and the heterocyclic group will determine the extent of protonation. If the acid has a $pK_a$ about two units lower (more acidic) than the conjugate acid of the heterocyclic group and is present in roughly equal molar amount essentially 99% of the heterocyclic groups will be protonated. Preferably the $pK_a$ of the Bronsted acid will be no more than 2 units greater than the conjugate acid of the heterocyclic side group, more preferably no more than 1 unit greater, and most preferably no greater than the conjugate acid of the heterocyclic side group. One skilled in the art will be able to identify those acids which will protonate or complex a given heterocyclic side group, and to calculate or measure the degree of protonation or association.

Once protonated or complexed a heterocyclic side group is much more polar and therefore increases the solubility of the polymer in highly polar solvents. Polyarylenes with a substantial fraction of protonated heterocyclic side groups will be soluble in highly polar solvents including but not limited to ethanol, methanol, and water.

Protonated polyarylenes with heterocyclic side groups are proton exchange resins, and are useful as proton exchange membranes for fuel cells and batteries, as ion exchange membranes for deionizing salt solutions, as proton transport membranes, and as solid acid catalysts.

Polyarylenes with heterocyclic side groups useful for protonation or complexation with Lewis acid to form ionic polymers will have heterocyclic groups with $pK_a$ s of from about −1 to about 12, preferably from about 1 to 8, and most preferably from about 2 to 7. For use in non-aqueous environment $pK_a$s of less than −1 may be useful. Polymers with heterocyclic side groups having $pK_a$s higher than 12 may be useful as anion exchange resins.

Non-limiting examples of Bronsted acids useful in the practice of the present invention are acetic acid, formic acid, hydrobromic acid, hydrofluoric acid, hydrochloric acid, hydriodic acid, methanesulfonic acid, trifluoromethanesulfonic acid, tosic acid, nitric acid, percholoric acid, phosphoric acid, polyphosphoric acid, sulfuric acid, sulfurous acid, trifluoroacetic acid, and the like.

Examples of Lewis acids useful in the practice of the present invention include, but are not limited to, aluminum tribromide, aluminum trichloride, boron tribromide, boron trichloride, boron trifluoride, cupric chloride, ferric chloride, gallium trichloride, tantalum pentafluoride, titanium tetrachloride, titanium tetrafluoride, zinc chloride, and the like.

The invention is further described below in several exemplary embodiments. The choices and amounts of reagents, temperatures, reaction times, are illustrative but are not considered limiting in any way. Other approaches are contemplated by, and within the scope, of the present invention.

EXAMPLE 1

Preparation of 2-2,5-Dichlorophenyl)benzothiazole 2,5-Dichlorobenzoic acid (18.3 g, 95.8 mmol) was mixed with aminothiophenol (13 g, 104 mmol) and 500 g polyphosphoric acid. The mixture was stirred at 60° C. for 2 hours and 110° C. overnight. The solution turned green. The temperature was raised gradually to 165° C. The mixture was kept at this temperature for 24 hours and poured onto ice. The solid was filtered and washed with 100 ml of 5% aqueous sodium bicarbonate. The solid material was then extracted with hot cyclohexane (500 ml). The cyclohexane solution was filtered through 10 g of silica gel and concentrated. The monomer was collected from the concentrated solution as white crystals and dried under vacuum, (18 g, m.p. 123°–125° C.).

EXAMPLE 2

Preparation of 2-(2,5-Dichlorophenyl)benzoxazole 2,5-Dichlorobenzoic acid (800 g, 4.2 mol), 2-aminophenol (415 g, 3.8 mol) and polyphosphoric acid (1600 g) were placed in a flask and heated at 180°–190° C. for 2 days. The viscous dark solution was poured onto ice while hot. The solid was collected by filtration and washed with water thoroughly. The solid cake was transferred into a large beaker and stirred with 2 liters of saturated aqueous sodium bicarbonate for 16 hours. The brownish suspension was filtered and washed with water and dried at 80° C. overnight to give 1 kg of crude product. The crude product was purified by recrystallization from cyclohexane twice to give 474 g of monomer as white crystals.

EXAMPLE 3

Preparation of 2,2'-[1,4-(2,5-Dichlorophenylene)]-bisbenzoxazole

The monomer 2,2'-[1,4-(2,5-Dichlorophenylene)]-bisbenzoxazole is prepared by condensation of 2,5-dichloroterephthalic acid and 2-aminophenol using the method given above in Example 2 for 2-(2,5-dichlorophenyl)benzoxazole.

EXAMPLE 4

Preparation of 2-(2,5-Dichlorophenyl)-4-phenylquinoline

2-Aminobenzophenone (33 g) and 2,5-dichloroacetophenone (32 g) were placed in a flask together with 2.5 g of toluenesulfonic acid monohydrate. The mixture was heated and stirred at 160°–170° C. for 24 hours. The resulting mixture was diluted with ethanol (300 ml). The crystals was filtered to give 63 g crude product, which was treated with charcoal and recrystallized first from ethanol, followed by recrystallization from hexane and ethyl acetate to give monomer as white crystals (65%).

EXAMPLE 5

Preparation of 3-(2,5-Dichlorophenyl)-pyridine

A 50 ml two-necked round-bottom flask is charged with 2-iodo-1,4-dichlorobenzene (5.44 g), tetrakis(triphenylphosphine)palladium (3 mol %, Aldrich), benzene (40 ml), and aqueous sodium carbonate solution (20 ml of 2M solution). To this vigorously stirred mixture is added 3-pyridylboronic acid (2.71 g) dissolved in a minimum amount of 95% ethanol. The reaction mixture is heated to 90°–95° C. and refluxed for 9 hours under vigorous stirring. The reaction mixture is then cooled to room temperature and the excess boronic acid is oxidized by 30% hydrogen peroxide (0.25 ml) for 1 hour. The mixture is extracted with ether, washed with saturated sodium chloride solution, and dried over anhydrous sodium sulfate. The solvent is removed, and the crude product is purified by chromatography on Florisil eluting with pentane/dichloromethane (90/10) to give monomer.

EXAMPLES 6–9

Using the method of Example 5 above for preparing 3-(2,5-dichlorophenyl)-pyridine, the following monomers are made from 2-iodo-1,4-dichlorobenzene and the listed heteroarylboronic acid prepared according to literature methods (Terashima, M., et al., Chem Pharm. Bull, 1983, 31, 4573; Fisher, F. C., et al., Recl. Trav. Chim. Pay-Bas, 1974, 93, 21):

TABLE 2

|  | starting boronic acid | monomer |
| --- | --- | --- |
| Example 6 | 4 pyridine-boronic acid | 4-(2,5-Dichloro-phenyl)-pyridine |
| Example 7 | 2-pyridine-boronic acid | 2-(2,5-Dichloro-phenyl)-pyridine |
| Example 8 | 4-quinoline-boronic acid | 4-(2,5-Dichloro-phenyl)-quinoline |
| Example 9 | 3-furanboronic acid | 3-(2,5-Dichloro-phenyl)-furan |

EXAMPLE 10

Polymerization of 2-(2,5-Dichlorophenyl)benzothiazole

Activated zinc dust was obtained after 2 washings of commercially available 325 mesh zinc dust with 1M hydrogen chloride in diethyl ether (anhydrous) followed by 2 washings with diethyl ether (anhydrous) and drying in vacuo or under inert atmosphere for several hours at about 100°–200° C. If clumps formed during drying the zinc dust was re-sieved to −150 mesh. This material was used immediately or stored under an inert atmosphere away from oxygen and moisture.

In a round-bottom flask was added 0.245 g bis (triphenylphosphine)nickel chloride, 0.34 g sodium iodide, 1.43 g triphenylphosphine, 1.23 g activated zinc dust, 3.78 g monomer and 25 ml of anhydrous N-methylpyrolidone (NMP). The mixture was stirred at 65° C. overnight. The viscous mixture was worked up by pouring into 100 ml of ethanol containing 10% HCl. The crude product was filtered out and washed with ethanol and acetone thoroughly, and dried at 120° C. overnight to give 2.9 g polymer.

EXAMPLES 11–18

The monomers in Table 3 are polymerized by a method analogous to that of Example 10 above.

A 2.0 L, three-necked, round-bottomed flask equipped with a mechanical stirrer, a condenser containing a nitrogen inlet valve, and a thermometer was charged with 250 g of 2,4-dichlorobenzoic acid, 157.1 g of 2-aminophenol, and 250 mL of polyphosphoric acid. The mixture was heated under nitrogen for 16 h. The solution was cooled to 140° C. and was poured over a chilled 1M aqueous sodium hydrox-

TABLE 3

| Example | Monomer | Polymer |
|---|---|---|
| 11 | 1,4-Bis (2-benzoxazolyl)-2,5-dichlorobenzene | |
| 12 | 3-(2,5-Dichlorophenyl)-pyridine | |
| 13 | 4-(2,5-Dichlorophenyl)-pyridine | |
| 14 | 2-(2,5-Dichlorophenyl)-pyridine | |
| 15 | 4-(2,5-Dichlorophenyl)-quinoline | |
| 16 | 3-(2,5-Dichlorophenyl)-furan | |

EXAMPLE 17

Preparation of 2-(2,4-Dichlorophenyl)benzoxazole ide solution. The solid brown precipitate was collected by filtration. The material was then vacuum distilled with a

EXAMPLE 18

Polymerization of 2-(2,4-Dichlorophenyl)benzoxazole

A 100 mL round bottomed flask was charged with 0.206 g of bis(triphenylphosphine) nickel chloride, 0.244 g of sodium iodide, 1.014 g of triphenylphosphine, 1.027 g of activated zinc dust, 3.000 g of 2-(2,4-dichlorophenyl) benzoxazole, and 15.5 mL of anhydrous N-methylpyrolidone (NMP). The mixture was stirred at 65° C. for 17 h under nitrogen. The dark polymer dope was then poured into 100 mL of a 10% hydrogen chloride/ethanol solution and was stirred until the color of the solution turned white. The white solid was collected by filtration and was twice washed with both 100 mL of hot ethanol and 100 mL of acetone. The solid was dried in a vacuum oven at 150° C. overnight, $M_w$=29,300.

EXAMPLE 19

Copolymerization of 80% 2-(2,4-Dichlorophenyl) benzoxazole and 20% 2,5 Dichloro-benzophenone A 100 mL round bottomed flask was charged with 0.430 g of bis(triphenylphosphine) nickel chloride, 0.507 g of sodium iodide, 2.112 g of triphenylphosphine, 2.140 g of activated zinc dust, 5.000 g of 2-(2,4-dichlorophenyl) benzoxazole, 1.188 g of 2,5-dichlorobenzophenone, and 32 mL of anhydrous N-methylpyrolidone (NMP). The mixture was stirred at 65° C. for 17 h under nitrogen. The dark polymer dope was then poured into 250 mL of a 10% hydrogen chloride/ethanol solution and was stirred until the color of the solution turned white. The white solid was collected by filtration and was washed twice with 250 mL of hot ethanol and twice with 250 mL of acetone. The solid was dried in a vacuum oven at 150° C. overnight. $M_w$=39,100.

EXAMPLE 20

Copolymerization of 50% 2-(2,4-Dichlorophenyl) benzoxazole and 50% 2,5 Dichloro-benzophenone A 100 mL round bottomed flask was charged with 0.413 g of bis(triphenylphosphine) nickel chloride, 0.487 g of sodium iodide, 2.027 g of triphenylphosphine, 2.055 g of activated zinc dust, 3.000 g of 2-(2,4-dichlorophenyl) benzoxazole, 2.852 g of 2,5-dichlorobenzophenone, and 31 mL of anhydrous N-methylpyrolidone (NMP). The mixture was stirred at 65° C. for 17 h under nitrogen. The dark polymer dope was then poured into 250 mL of a 10% hydrogen chloride/ethanol solution and was stirred until the color of the solution turned white. The white solid was collected by filtration and was twice washed with both 250 mL of hot ethanol and 250 mL of acetone. The solid was dried in a vacuum oven at 150° C. overnight, $M_w$=63,200.

EXAMPLE 21

Polymerization of 4,4'bis(N-phthalimido)-3,3'-dichlorobiphenyl

A 100 mL round bottomed flask is charged with 0.206 g of bis(triphenylphosphine) nickel chloride, 0.244 g of sodium iodide, 1.014 g of triphenylphosphine, 1.027 g of activated zinc dust, 5.831 g of 4,4'-bis(N-phthalimido)-3,3'-dichlorobiphenyl, and 15.5 mL of anhydrous N-methylpyrolidone (NMP). The mixture is stirred at 65° C. for 17 h under nitrogen. The polymer dope is then poured into 100 mL of a 10% hydrogen chloride/ethanol solution and is stirred until the solution becomes light in color. The solid is collected by filtration and is twice washed with both hot ethanol and acetone. The solid is dried in a vacuum oven.

EXAMPLE 22

Polymerization of 2-(2,5-Dichlorophenyl)-4-phenyl-quinoline to the polymer of formula:

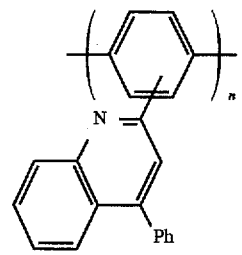

To a round-bottom flask was added 0.262 g of bis (triphenylphosphine)nickel chloride, 0.37 g of sodium iodide, 1.91 g of triphenylphosphine, 1.57 g of activated zinc dust, 5.6 g of 2-(2,5-dichloro-phenyl)-4-phenylquinoline and 30 ml of anhydrous NMP. The mixture was stirred at 65° C. overnight. The mixture was worked up by stirring with 100 ml of ethanol containing 10% HCl. The crude product was filtered out and washed with ethanol and acetone thoroughly followed by stirring with acetone containing 10% triethylamine, and dried at 120° C. overnight to give 4.5 g polymer.

EXAMPLE 23

Polymerization of 2-(2,5-Dichlorophenyl)benzoxazole to the polymer of formula:

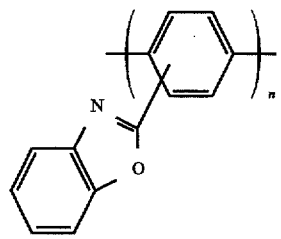

To a round-bottom flask was added 0.206 g of bis (triphenylphosphine)nickel chloride, 0.244 g of sodium iodide, 1.01 g of triphenylphosphine, 1.02 g of activated zinc dust, 3.0 g of 2-(2,5-dichlorophenyl)benzoxazole and 16 ml of anhydros NMP. The mixture was stirred at 65° C. overnight. The viscous mixture was worked up by poured into 100 ml of ethanol containing 10% HCl. The crude product was filtered out and washed with ethanol and acetone thoroughly, and dried at 120° C. overnight to give 2 g polymer. The $T_g$ was measured to be 261oC. by DSC.

EXAMPLE 24

2,5-Difluorobenzoic acid (60 g, 0.38 mol) is mixed with 2-aminophenol (43.7 g, 0.4 mol), and polyphosphoric acid (160 g). The mixture is stirred at 60° C. for 2 hours, 110° C. for 16 hours and 165° C. for 24 hours. The mixture is then poured onto ice and the solid collected on a filter and is washed with 50 ml of 5% aqueous sodium bicarbonate. The solid material is then extracted with hot cyclohexane (100 ml). The cyclohexane solution is filtered through 5 g of silica gel and is concentrated under reduced pressure. The product 2-(2,4-difluoro-phenyl)benzoxazole is filtered and dried under vacuum.

Preparation of:

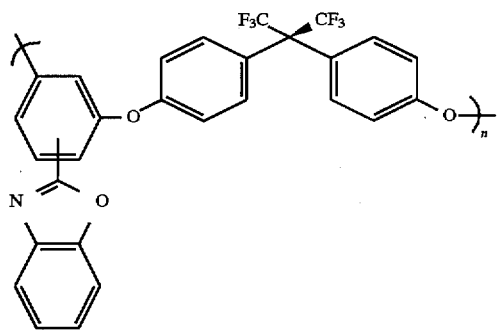

To 2-(2,4-difluoro)benzoxazole (10 g, 21.73 mmol) in 100 ml of NMP and 20 ml of toluene is added potassium carbonate (3.46 g, 25 mmol) and bisphenol AF (4,4'-hexafluoroisopropylidenediphenol) (7.306 g, 21.73 mmol). The mixture is taken to reflux under and water is removed using a Dean-Stark trap. After water ceases to collect the toluene is distilled off and the temperature is raised to 200° C. After 48 hours, or until the desired MW is reached as measured by GPC, the mixture is cooled to room temperature and slowly poured into ethanol to precipitate the product polymer. The polymer is filtered, washed ethanol and acetone, and dried.

EXAMPLE 25

The polymer of Example 23 (20 g) is dissolved in 200 ml of NMP by heating to 120° C. and stirring. The solution is cooled to room temperature and cast onto a 30 cm×60 cm glass plate using a doctors blade set to a height of 125 microns under a flow of dry air. The coated plate is placed in a vacuum oven, and leveled. The coated plate is dried at about 1 torr and 100° C. for 4 hours and then 1 torr and 175° C. for 16 hours. The dried film is then removed from the glass plate by scoring an edge of the film, immersing the plate into water, and slowing peeling the film off the plate.

EXAMPLE 26

Following the same procedure as in Example 25 the polymer of Example 20 is cast into a film.

The invention has been described in preferred and exemplary embodiments but is not limited thereto. Those skilled in the art will appreciate that various modifications can be made without departing from the scope of the invention, which is defined by the following claims.

What is claimed is:

1. A polymer of the formula:

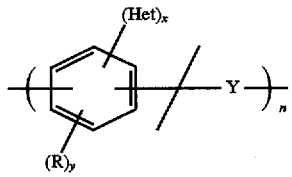

wherein: up to three CH units in each aromatic ring may be replaced by nitrogen atoms;

Het is a heterocyclic group;

x is 1 or 2;

y is less than or equal to 4−x;

R is independently alkyl, aryl, alkoxy, aryloxy, ketone, aldehyde, amide, ester, sulfone, cyano, fluoro, and oligomeric or polymeric groups comprising polyalkeneoxy, polyaryleneoxy, polyarylenesulfate, polyarylene sulfone, polyphenoxyphenylketone, polystyrene, polyphenylene, polyamide and polyimide;

Y is selected from the group consisting of nil, —Ar—, —Z—, —Z—Ar—, and —AR—Z—Ar—, where Z is a divalent group selected from the group consisting of —O—, —S—, —NR'—, —O(CO)—, —(CO)NH(CO)—, —NR'(CO)—, phthalimide, pyromellitimide, —CO—, —CH$_2$—, —CF$_2$— and —CR'R"—, wherein R' and R" are independently alkyl or aryl, and taken together may be bridging, and where Ar is selected from the group consisting of arylene, heteroarylene and arylene and heteroarylene substituted with at least one R group; and n is greater than about 4.

2. The polymer of claim 1 wherein Het is a heteroaromatic group.

3. The polymer of claim 1 wherein the heterocyclic side groups are selected from the group consisting of benzimidazolyl, benzofuranyl, benzoxazolyl, benzthiazolyl, dioxolanyl, dithianyl, furanyl, imidazolyl, indolyl, isoquinolinyl, maleimidyl, morpholinyl, oxadiazolyl, oxazolyl, phthalimidyl, piperidinyl, purinyl, pyranyl, pyrazinyl, pyridazinyl, pyridyl, pyrimidinyl, quinazolinyl, quinazolonyl, quinolinyl, quinolonyl, quinoxalinyl, succinimidyl, tetrahydrofuranyl, thiophenyl, and triazinyl.

4. The polymer of claim 3 wherein said polymer is a co-polymer.

5. The polymer of claim 1 wherein Y is nil.

6. The polymer of claim 1 wherein Y is nil and greater than 50% of the heterocyclic substituted arylene repeat units are 1,4 catenated.

7. The polymer of claim 5 wherein y=0.

8. The polymer of claim 6 wherein y=0.

9. The polymer of claim 1 wherein Y is substantially nil, x is 1, and y is 0.

10. The polymer of claim 9 wherein Het is selected from the group consisting of 2-benzimidazolyl, 2-benzoxazolyl, 2-benzthiazolyl, 2-quinolyl, and 4-phenyl-2-quinolyl.

11. The polymer of claim 9 wherein at least 50% of the heterocyclic substituted arylene units are 1,4 catenated.

12. The polymer of claim 1 wherein Y is selected from the group consisting of 5-amino-1,4-phenylene, 2-benzoyl-1,4-phenylene, 4-benzoyl-1,3-phenylene, 5-benzoyl-1,3-phenylene, 2-carboxymethyl-1,4-phenylene, 4-carboxymethyl-1,3-phenylene, 5-carboxy-methyl-1,3-phenylene, 2-phenyl-1,4-phenylene, isophthaloyl, 1,4-phenylene, 1,3-phenylene, 1,2-phenylene, 3,5-pyridinediyl, and terephthaloyl.

13. The polymer of claim 12 wherein Y is 1,3-phenylene.

14. The polymer of claim 13 wherein x is 1, y is 0, and Het is chosen from the group consisting of benzimidazole, benzofuran, benzoxazole, benzthiazole, dioxolane, dithiane, furan, imidazole, indole, isoquinoline, maleimide, morpholine, oxadiazole, oxazole, phthalimide, piperidine, purine, pyran, pyrazine, pyridazine, pyridine, pyrimidine, quinazoline, quinazolone, quinoline, quinolone, quinoxaline, succinimide, tetrahydrofuran, thiophene, and triazine.

15. The polymer of claim 13 wherein x is 1, y is 0, and Het is chosen from the group consisting of 2-benzimidazole, 2-benzoxazole, 2-benzthiazole, 2-quinolyl, and 4-phenyl-2-quinolyl.

16. The polymer of claim 1 wherein Y is selected from the group consisting of -(phenylene-CONH-phenylene-NHCO)-phenylene, -(phenylene-CONH-phenylene)-, -(phenylene-COO-phenylene-OCO)-phenylene-, -(phenylene-carbonyl)-phenylene-, and -(phenylene-carbonyl-phenylene-oxo-phenylene-carbonyl-phenylene)-.

17. The polymer of claim 1 wherein the repeat units Y form a block selected from the group consisting of -phenylene-CONH-phenylene-NHCO)$_m$-phenylene, -(phenylene-CONH)$_m$-phenylene-, -(phenylene-COO-phenylene-OCO)$_m$-phenylene-, -(phenylene-carbonyl)$_m$-phenylene-, and -(phenylene-carbonate-phenylene-2,2-isopropyl-idene-carbonate)$_m$-phenylene-.

18. The polymer of claim 1 wherein the polymer is a block co-polymer and the repeat units Y form oligomeric or polymeric segments selected from the group consisting of polyamide, polyarylate, polyaryleneoxide, polycarbonate, polydimethylsiloxane, polyester, polyetherketone, polyphenylene, substituted polyphenylene, polyphenylenesulfide, and polystyrene.

19. The polymer of claim 1 wherein the heterocyclic groups are at least partly randomly distributed among the possible positions on the aromatic rings.

20. The polymer of claim 1 wherein at least 5% of the heterocyclic groups are ortho to the site of catenation.

21. The polymer of claim 20 wherein at least 10% of the heterocyclic groups are ortho to the site of catenation.

22. The polymer of claim 21 wherein at least 25% of the heterocyclic groups are ortho to the site of catenation.

23. The polymer of claim 1 wherein at least a portion of the heterocyclic groups are protonated.

24. The polymer of claim 1 wherein n is from about 10 to about 100,000.

25. The polymer of claim 1 wherein n is from about 20 to about 10,000.

26. The polymer of claim 1 wherein n is from about 50 to about 1,000.

27. The polymer of claim 1 wherein Y is nil and n is up to about 500.

28. A polymeric composition comprising the polymer of claim 1 and an acid.

29. The polymer of claim 28 wherein the acid is a Bronsted acid having a pK$_a$ no more than 2 units greater than the pK$_a$ of the conjugate acid of said heterocyclic side group.

30. The composition of claim 28 wherein the acid is a Lewis acid.

31. A process for preparing the composition of claim 1 wherein a heterocyclic substituted arylene of structure:

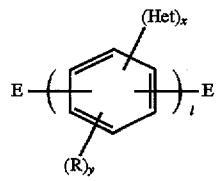

is allowed to react with a complementary difunctional monomer E'—(Y)$_m$—E' where E and E' are complementary reactive groups.

32. The process of claim 31 wherein E is selected from the group consisting of acid chloride, amine aryl alcohol, aryl amine, aryl acid chloride, aryl carboxylic acid, arylfluoride, carboxylic acid, epoxide, fluoride, hydroxy, isocyanate, and silyl chloride.

33. The process of claim 31 wherein E' is selected from the group consisting of acid chloride, amine, aryl alcohol, aryl amine, aryl acid chloride, aryl carboxylic acid, arylfluoride, carboxylic acid, epoxide, fluoride, hydroxy, isocyanate, and silyl chloride.

34. The process of claim 31 wherein E is selected from the group consisting of aryl fluoride, and fluoride, and E' is an alcohol anion.

35. The process of claim 31 wherein E is selected from the group consisting of acid chloride, aryl acid chloride, aryl carboxylic acid, carboxylic acid and E' is selected from the group consisting of hydroxy, and amine.

36. The process of claim 31 wherein E is selected from the group consisting of amine, aryl alcohol, aryl amine, and hydroxy and E' is selected from the group consisting of acid chloride, carboxylic acid, epoxide, isocyanate, and silyl chloride.

37. The process of claim 31 wherein 1 is between 2 and 200.

38. The process of claim 31 wherein 1 is between 1 and 10 and m is between 1 and 10.

39. A polymer comprising repeat units of the general formula:

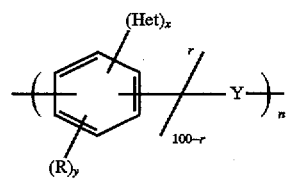

where r is at least 1; and wherein:
up to three CH units in each aromatic ring may be replaced by nitrogen atoms;
Het is a heterocyclic group;
x is 1 or 2;
y is less than or equal to 4–x
R is independently alkyl, aryl, alkoxy, aryloxy, ketone, aldehyde, amide, ester, sulfone, cyano, fluoro, and oligomeric or polymeric groups comprising polyalkeneoxy, polyaryleneoxy, polyarylenesulfate, polyarylene sulfone, polyphenoxyphenylketone, polystyrene, polyphenylene, polyamide and polyimide;
Y is selected from the group consisting of nil, —Ar—, —Z—, —Z—Ar—, and —AR—Z—Ar—, where Z is a divalent group selected from the group consisting of —O—, —S—, —NR'—, —O(CO)—, —(CO)N(CO)—, —NR'(CO)—, phthalimide, pyromellitimide, —CO—, —CH$_2$—, —CF$_2$— and —CR'R"—, wherein R' and R" are independently alkyl or aryl, and taken together may be bridging, and where Ar is selected from the group consisting of arylene, heteroarylene and arylene and heteroarylene substituted with at least one R group; and
n is greater than about 4.

40. The polymer of claim 39 wherein r is at least 10.

41. The polymer of claim 39 wherein r is at least 20.

42. The polymer of claim 39 wherein Het is a heteroaromatic group.

43. The polymer of claim 39 wherein the heterocyclic side groups are selected from the group consisting of benzimidazolyl, benzofuranyl, benzoxazolyl, benzthiazolyl, dioxolanyl, dithianyl, furanyl, imidazolyl, indolyl, isoquininyl, maleimidyl, vmorpholinyl, oxadiazolyl, oxazolyl, phthalimidyl, piperidinyl, purinyl, pyranyl, pyrazinyl, pyridazinyl, pyridyl, pyrimidinyl, quinazolinyl, quinazolonyl, quinolinyl, quinolonyl, quinoxalinyl, succinimidyl, tetrahydrofuranyl, thiophenyl, and triazinyl.

44. The polymer of claim 39 wherein the polymer comprises the repeat units:

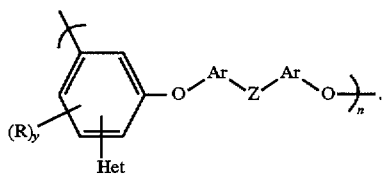

45. The polymer of claim 39 wherein the polymer comprises the repeat units:

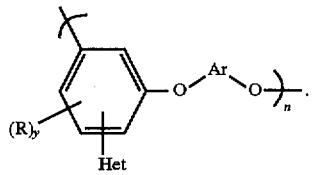

46. The polymer of claim 43 wherein Y is substantially nil, x is 1, and y is 0.

47. The polymer of claim 46 wherein Het is selected from the group consisting of 2-benzimidazolyl, 2-benzoxazolyl, 2-benzthiazolyl, 2-quinolyl, and 4-phenyl-2-quinolyl.

48. The polymer of claim 46 wherein at least 50% of the heterocyclic substituted arylene units are 1,4 catenated.

49. The polymer of claim 39 wherein Y is selected from the group consisting of 5-amino-1,4-phenylene, 2-benzoyl-1,4-phenylene, 4-benzoyl-1,3-phenylene, 5-benzoyl-1,3-phenylene, 2-carboxymethyl-1,4-phenylene, 4-carboxymethyl-1,3-phenylene, 5-carboxymethyl-1,3-phenylene, 2-phenyl-1,4-phenylene, isophthaloyl, 1,4-phenylene, 1,3-phenylene, 1,2-phenylene, 3,5-pyridinediyl, and terephthaloyl.

50. The polymer of claim 49 wherein Y is 1,3-phenylene.

51. The polymer of claim 50 wherein x is 1, y is 0, and Het is chosen from the group consisting of benzimidazole, benzofuran, benzoxazole, benzthiazole, dioxolane, dithiane, furan, imidazole, indole, isoquinoline, maleimide, morpholine, oxadiazole, oxazole, phthalimide, piperidine, purine, pyran, pyrazine, pyridazine, pyridine, pyrimidine, quinazoline, quinazolone, quinoline, quinolone, quinoxaline, succinimide, tetrahydrofuran, thiophene, and triazine.

52. The polymer of claim 50 wherein x is 1, y is 0, and Het is chosen from the group consisting of 2-benzimidazole, 2-benzoxazole, 2-benzthiazole, 2-quinolyl, and 4-phenyl-2-quinolyl.

53. The polymer of claim 39 wherein the heterocyclic groups are at least partly randomly distributed among the possible positions on the aromatic rings.

54. The polymer of claim 39 wherein at least 5% of the heterocyclic groups are ortho to the site of catenation.

55. The polymer of claim 39 wherein n is from about 50 to about 1,000.

56. The polymer of claim 39 wherein Y is nil and n is up to about 500.

57. A polymeric composition comprising the polymer of claim 39 and an acid.

58. A process for preparing the composition of claim 39 wherein a heterocyclic substituted arylene of structure:

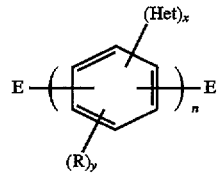

is allowed to react with a complementary difunctional monomer E'—(Y)$_m$—E' where E and E' are complementary reactive groups.

59. The process of claim 58 wherein l is 1.

60. The process of claim 58 wherein l is between 2 and 200.

61. The process of claim 58 wherein l is between 1 and 10 and m is between 1 and 10.

* * * * *

UNITED STATES PATENT AND TRADEMARK OFFICE
CERTIFICATE OF CORRECTION

PATENT NO. : 5,668,245
DATED : September 16, 1997
INVENTOR(S) : Matthew L. Morrocco, III; Ying Wang; Virgil J. Lee It is certified that error appears in the above-indentified patent and that said Letters Patent is hereby corrected as shown below:

On the title page, Item [56] References Cited, Other Publications,
　　After "Stille et al, " change ""Diels-Alder Polyers:" to
　　-- Diels-Alder Polymers: --.
Column 3, line 47, change "1-phenyl-3-phthlimidyl" to
　　-- 1-phenyl-3-phthalimidyl --.
Column 3, line 67, change "2-phenosxyethyl land" to
　　-- 2-phenoxyethyl and --.
Column 4, line 36, change "alky" to -- alkyl --.
Column 4, line 55, change "2,4-pyrindin-ediyl" to -- 2,4-pyrindinediyl --
.Column 5, line 33, change "4,4'-dihyroxybiphyhenyl" to
　　-- 4,4'-dihydroxybiphyhenyl --.
Column 5, lines 38,39, change "4,4,'-methylenedianiline" to
　　-- 4,4'-methylenedianiline --.
Column 6, line 14, before "general" insert -- the --.
Column 7, line 8, replace the structure as follows:

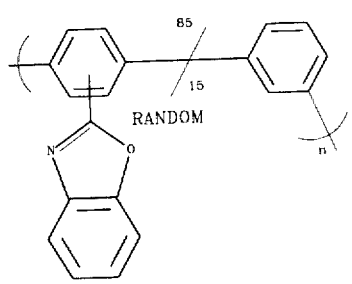

UNITED STATES PATENT AND TRADEMARK OFFICE
CERTIFICATE OF CORRECTION

PATENT NO. : 5,668,245
DATED : September 16, 1997
INVENTOR(S) : Matthew L. Morrocco, III; Ying Wang; Virgil J. Lee It is certified that error appears in the above-indentified patent and that said Letters Patent is hereby corrected as shown below:

Column 9, line 58, change "sulonates" to -- sulfonates --.
Column 13, line 23, change "a oligomeric" to -- an oligomeric --.
Column 17, line 14, change "scope, of" to -- scope of, --.
Column 17, line 18, change "2-2,5-Dichlorophenyl)benzothiazole"
 -- 2-(2,5-Dichlorophenyl)benzothiazole --.
Column 17, line 29, after "vacuum" delete the comma.
Column 17, line 66, after "crystals" change "was" to -- were --.
Column 18, line 64, change "N-methylpyrolidone" to
 -- N-methylpyrrolidone --.
Column 21, lines 12,30, change "N-methylpyrolidone" to
 -- N-methylpyrrolidone -- (both occurrences).
Column 21, line 37, change "overnight. $M_w$=39,100." to
 -- overnight, $M_w$=39,100. --.
Column 21, lines 48,65, change "N-methylpyrolidone" to
 -- N-methylpyrrolidone -- (both occurrences).
Column 22, line 51, change "anhydros" to -- anhydrous --.
Column 22, line 52, change "poured" into -- pouring --.
Column 22, line 56, change "261oC." to -- 261°C. --.
Column 23, line 29, after "washed" insert -- with --.
Column 23, line 43, change "slowing" to -- slowly --.

UNITED STATES PATENT AND TRADEMARK OFFICE
CERTIFICATE OF CORRECTION

PATENT NO. : 5,668,245
DATED : September 16, 1997
INVENTOR(S) : Matthew L. Morrocco, III; Ying Wang; Virgil J. Lee It is certified that error appears in the above-indentified patent and that said Letters Patent is hereby corrected as shown below:

Column 24, line 3, change "aidehyde" to -- aldehyde --.
Column 26, line 63, change "vmorpholinyl" to -- morpholinyl --.

Signed and Sealed this

Twenty-fifth Day of August, 1998

Attest:

Attesting Officer

BRUCE LEHMAN

Commissioner of Patents and Trademarks